(12) United States Patent
Kang et al.

(10) Patent No.: US 11,827,280 B2
(45) Date of Patent: Nov. 28, 2023

(54) VEHICLE LOAD DISTRIBUTION SYSTEM

(71) Applicants: Hyundai Motor Company, Seoul (KR); Kia Corporation, Seoul (KR)

(72) Inventors: Jeon Woong Kang, Hwaseong-si (KR); Huen Sick Min, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/752,098

(22) Filed: May 24, 2022

(65) Prior Publication Data

US 2023/0141662 A1 May 11, 2023

(30) Foreign Application Priority Data

Nov. 9, 2021 (KR) .................. 10-2021-0153396

(51) Int. Cl.
*B62D 25/08* (2006.01)
*B62D 25/20* (2006.01)
*B62D 25/14* (2006.01)
*B62D 27/02* (2006.01)
*B62D 21/15* (2006.01)

(52) U.S. Cl.
CPC .......... *B62D 25/20* (2013.01); *B62D 21/152* (2013.01); *B62D 25/08* (2013.01); *B62D 25/145* (2013.01); *B62D 27/023* (2013.01)

(58) Field of Classification Search
CPC .. B62D 23/005; B62D 27/023; B62D 21/152; B62D 25/145

USPC ......... 296/209, 205, 29, 30, 193.02, 187.09, 296/187.1, 204
See application file for complete search history.

(56) References Cited

U.S. PATENT DOCUMENTS

| 2,301,593 | A | * | 11/1942 | Ulrich ................... B60G 11/42 267/269 |
| 4,881,756 | A | * | 11/1989 | Kumasaka ............. B62D 65/04 296/193.03 |
| 9,623,908 | B2 | * | 4/2017 | Natsume ................ B62D 21/06 |
| 11,001,308 | B2 | | 5/2021 | Atsumi et al. |
| 11,027,780 | B2 | | 6/2021 | Ayukawa |
| 2016/0068193 | A1 | * | 3/2016 | Koike ................ B62D 25/2045 296/187.09 |
| 2020/0047810 | A1 | | 2/2020 | Ayukawa |

FOREIGN PATENT DOCUMENTS

| JP | 2013220734 A | 10/2013 |
| JP | 2016010982 A | 1/2016 |
| JP | 2019001390 A | 1/2019 |
| JP | 2020023260 A | 2/2020 |
| JP | 2020203572 A | 12/2020 |
| KR | 102311669 B1 * | 10/2021 |

* cited by examiner

*Primary Examiner* — Dennis H Pedder
(74) *Attorney, Agent, or Firm* — Slater Matsil, LLP

(57) ABSTRACT

An embodiment vehicle load distribution system includes a dash crossmember, a pair of front side members extending from the dash crossmember toward a front of a vehicle, and a pair of rear lower members extending from the dash crossmember toward a rear of the vehicle, wherein a front end of each rear lower member is aligned with a rear end of a corresponding front side member.

20 Claims, 7 Drawing Sheets

VEHICLE LOAD DISTRIBUTION SYSTEM

CROSS-REFERENCE TO RELATED APPLICATIONS

This application claims the benefit of Korean Patent Application No. 10-2021-0153396, filed on Nov. 9, 2021, which application is hereby incorporated herein by reference.

TECHNICAL FIELD

The present disclosure relates to a vehicle load distribution system.

BACKGROUND

A vehicle frame, which is a structure designed to install chassis components or a vehicle body, should be sufficiently protected from local or overall damages due to deformation, torsion, tension, compression, and/or vibration caused by the vehicle's propulsion force, brake action, a centrifugal force during steering, an impact from a road surface, a vertical load due to the weight of the vehicle body, and various reaction forces. It should be of a structure that can sufficiently absorb impact energy applied to the vehicle in the event of a collision.

Due to diversification of the vehicle market, the vehicle frame is being changed in various ways from an existing monocoque structure to a novel structure such as a purpose built vehicle (PBV) frame and a space frame, to meet each vehicle's purpose. In particular, a low-cost electric vehicle (EV) requires a vehicle body structure which is created by breaking an existing method in order to maximize profitability.

Existing vehicles use pressed steel materials and aluminum materials for the frame, and thus the material cost and investment cost thereof may be relatively high.

In addition, since a joint portion between structural members constituting the existing vehicle frame is made by welding, the joint portion between the structural members may be easily damaged by an impact load during a frontal collision of the vehicle. In addition, it may be difficult to uniformly distribute a load transferred from the front of the vehicle body. Thus, it may be difficult to safely protect a passenger compartment and a vehicle battery.

The above information described in this background section is provided to assist in understanding the background of the inventive concept, and may include any technical concept which is not considered as the prior art that is already known to those skilled in the art.

SUMMARY

The present disclosure relates to a vehicle load distribution system. Particular embodiments relate to a vehicle load distribution system designed to uniformly distribute a load transferred to the front of the vehicle.

Embodiments of the present disclosure can solve problems occurring in the prior art while advantages achieved by the prior art are maintained intact.

An embodiment of the present disclosure provides a vehicle load distribution system uniformly distributing a load in the event of a frontal collision of the vehicle, and using a relatively inexpensive material such as mass-produced steel pipes, thereby significantly reducing the manufacturing cost thereof, compared to when using pressed steel materials and aluminum materials.

According to an embodiment of the present disclosure, a vehicle load distribution system may include a dash crossmember, a pair of front side members extending from the dash crossmember toward the front of the vehicle, and a pair of rear lower members extending from the dash crossmember toward the rear of the vehicle. A front end of each rear lower member may be aligned with a rear end of a corresponding front side member.

The pair of front side members may be connected to the dash crossmember so that the dash crossmember may primarily support a load transferred through the front side members. In particular, the rear lower members may be aligned with the corresponding front side members so that the load may be stably transferred and distributed to the front side members, the dash crossmember, and the rear lower members.

The vehicle load distribution system may further include a front crossmember located behind the dash crossmember. The pair of rear lower members may connect the dash crossmember and the front crossmember in a longitudinal direction of the vehicle.

The pair of rear lower members may connect the dash crossmember and the front crossmember so that the front crossmember may secondarily support the load transferred through the rear lower members.

The vehicle load distribution system may further include a seat crossmember located behind the front crossmember and a central longitudinal member connecting the dash crossmember and the seat crossmember. The central longitudinal member may extend along a central longitudinal axis of the vehicle.

The central longitudinal member may connect the dash crossmember and the seat crossmember so that the seat crossmember may thirdly support the load transferred through the central longitudinal member.

Each front side member may have an opening provided in the rear end thereof, and the dash crossmember may be fitted and joined to the opening of the front side member.

The opening of the front side member may include a top engaging portion joined to a top surface of the dash crossmember and a front engaging portion joined to a front surface of the dash crossmember.

The rear end of the front side member may be mechanically joined to the dash crossmember. That is, the rear end of the front side member may be very firmly joined to the dash crossmember through a mechanical joint system.

Each rear lower member may include a front engaging portion provided on the front end thereof, and the front engaging portion may be joined to a rear surface of the dash crossmember.

The rear lower member may further include a bracket integrally connected to the front end thereof, and the bracket may include a bottom engaging portion joined to a bottom surface of the dash crossmember.

The front end of the rear lower member may be mechanically joined to the dash crossmember. That is, the front end of the rear lower member may be very firmly joined to the dash crossmember through a mechanical joint system.

Each rear lower member may have an opening provided in a rear end thereof, and the front crossmember may be fitted and joined to the opening of the rear lower member.

The opening of the rear lower member may include a top engaging portion joined to a top surface of the front crossmember, a front engaging portion joined to a front surface of the front crossmember, and a bottom engaging portion joined to a bottom surface of the front crossmember.

The rear end of the rear lower member may be mechanically joined to the front crossmember. That is, the rear end of the rear lower member may be very firmly joined to the front crossmember through a mechanical joint system.

The central longitudinal member may have a front opening provided in a front end thereof, and the dash crossmember may be fitted and joined to the front opening of the central longitudinal member.

The front opening may include a front engaging portion joined to a rear surface of the dash crossmember, and a bottom engaging portion joined to a bottom surface of the dash crossmember.

The front end of the central longitudinal member may be mechanically joined to the dash crossmember. That is, the front end of the central longitudinal member may be very firmly joined to the dash crossmember through a mechanical joint system.

The central longitudinal member may have a rear opening provided in a rear end thereof, and the seat crossmember may be fitted and joined to the rear opening of the central longitudinal member.

The rear opening may include a top engaging portion joined to a top surface of the seat crossmember, a rear engaging portion joined to a front surface of the seat crossmember, and a bottom engaging portion joined to a bottom surface of the seat crossmember.

The rear end of the central longitudinal member may be mechanically joined to the seat crossmember. That is, the rear end of the central longitudinal member may be very firmly joined to the seat crossmember through a mechanical joint system.

The front crossmember may have a pair of side openings provided in both end portions thereof, respectively, and each side sill may be fitted and joined to a corresponding side opening of the front crossmember.

Each side opening may include a side engaging portion joined to an inboard side surface of the side sill, and a bottom engaging portion joined to a bottom surface of the side sill.

Each end portion of the front crossmember may be mechanically joined to the side sill. That is, both end portions of the front crossmember may be very firmly joined to the pair of side sills through a mechanical joint system.

The front crossmember may have a central opening provided in a central portion thereof, and the central longitudinal member may be fitted and joined to the central opening of the front crossmember.

The central opening may include a bottom engaging portion joined to a bottom surface of the central longitudinal member, a first side engaging portion joined to a first side surface of the central longitudinal member, and a second side engaging portion joined to a second side surface of the central longitudinal member.

The central longitudinal member may be mechanically joined to the central portion of the front crossmember. That is, the central longitudinal member may be very firmly joined to the central portion of the front crossmember through a mechanical joint system.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
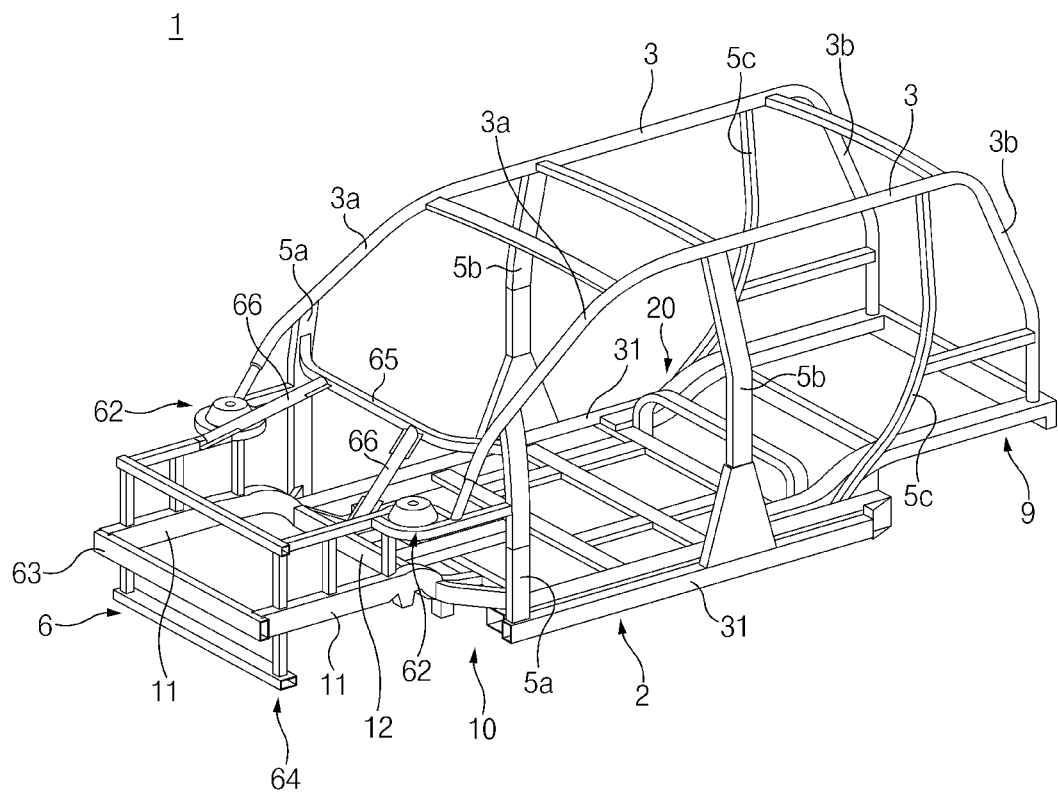
FIG. 1 illustrates a vehicle frame to which a vehicle load distribution system according to an exemplary embodiment of the present disclosure is applied.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle frame 1 to which a vehicle load distribution system according to an exemplary embodiment of the present disclosure is applied.

Referring to FIG. 1, the vehicle frame 1 may include a center frame module 2, a front structure 6 connected to the front of the center frame module 2, a rear frame module 9 connected to the rear of the center frame module 2, and an intermediate structure 20 disposed between the center frame module 2 and the rear frame module 9.

A pair of front pillars 5a may extend from the front of the center frame module 2 in a height direction of the vehicle, and the pair of front pillars 5a may be spaced apart from each other in a width direction of the vehicle.

A pair of center pillars 5b may extend from the center of the center frame module 2 in the height direction of the vehicle, and the pair of center pillars 5b may be spaced apart from each other in the width direction of the vehicle.

A pair of rear pillars 5c may extend from the rear of the center frame module 2 in the height direction of the vehicle, and the pair of rear pillars 5c may be spaced apart from each other in the width direction of the vehicle.

A pair of roof rails 3 may be disposed above the center frame module 2, and each roof rail 3 may extend in a longitudinal direction of the vehicle. Each roof rail 3 may connect a top end of the corresponding front pillar 5a, a top end of the corresponding center pillar 5b, and a top end of the corresponding rear pillar 5c. Each roof rail 3 may have a front extension portion 3a extending obliquely from a front end thereof, and a rear extension portion 3b extending obliquely from a rear end thereof.

Figure 3:
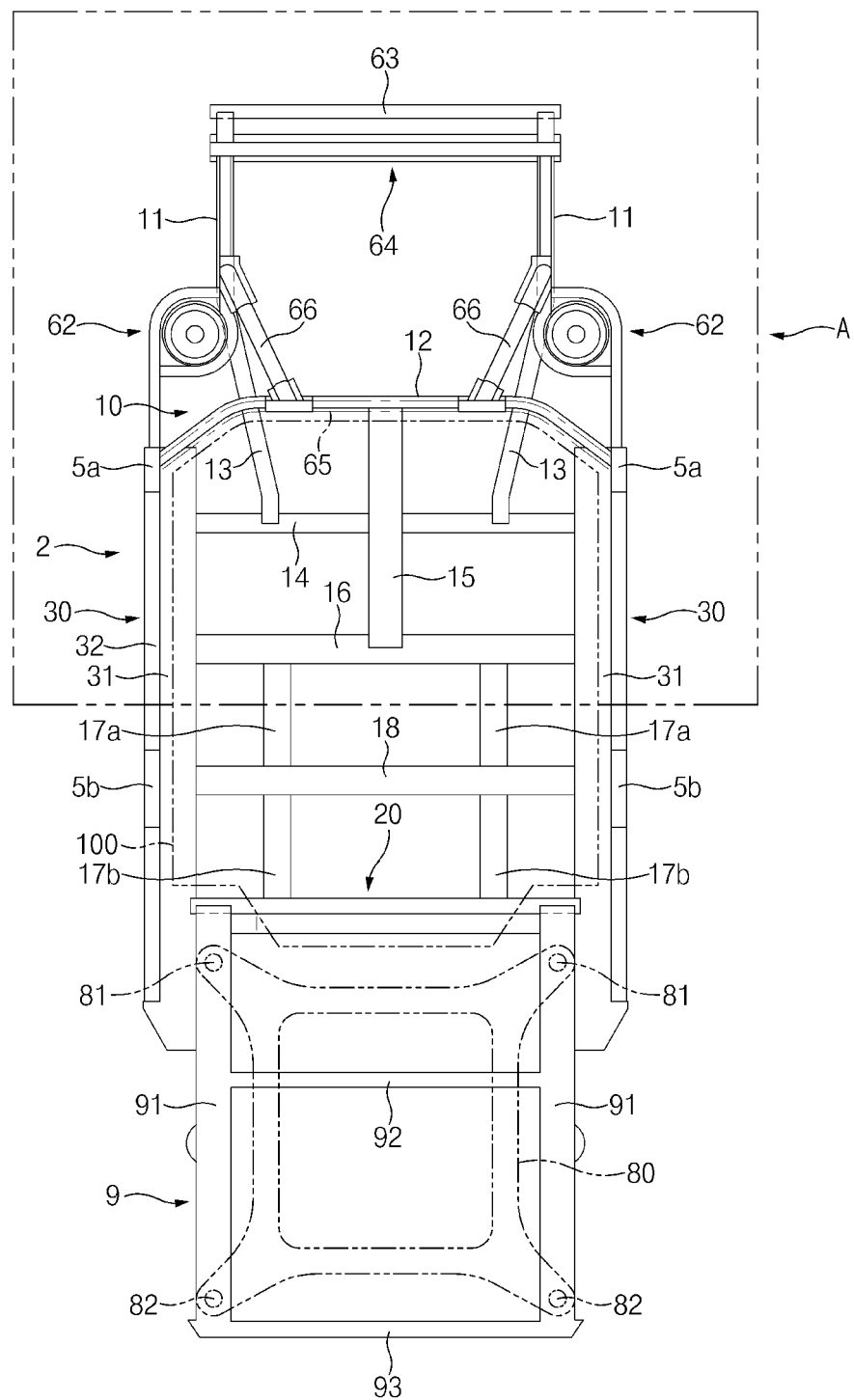
FIG. 3 illustrates a plan view of the vehicle frame illustrated in FIG. 1, from which a pair of roof rails are removed.
Figure 4:
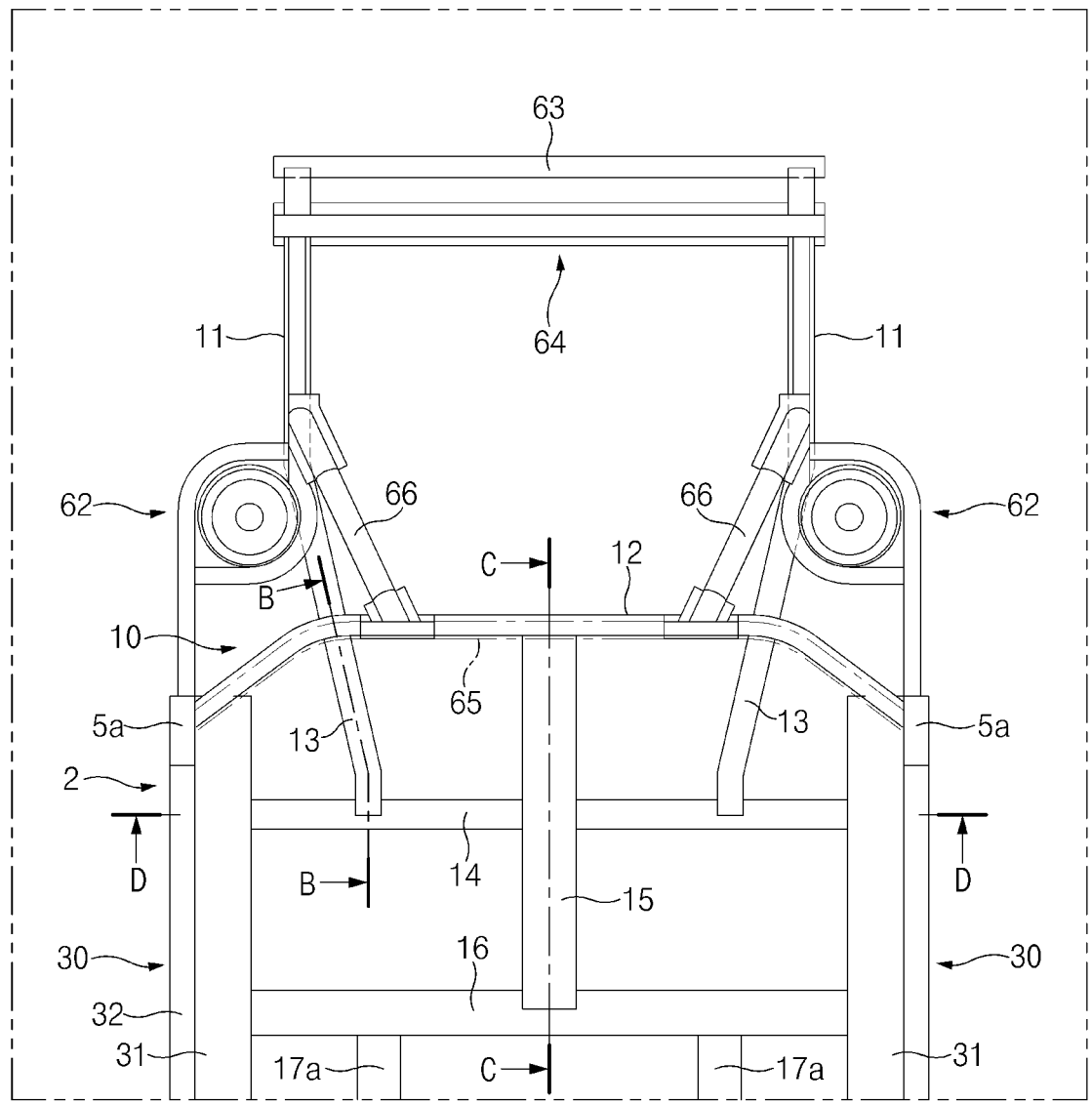
FIG. 4 illustrates an enlarged view of portion A of FIG. 3.

Referring to FIGS. 3 and 4, the center frame module 2 may include a pair of side sills 30 disposed on both side edges thereof, a plurality of crossmembers 12, 14, 16, and 18 connecting the pair of side sills 30 in the width direction of the vehicle, and a plurality of longitudinal members 13, 15, 17a, and 17b extending in the longitudinal direction of the vehicle.

Figure 7:
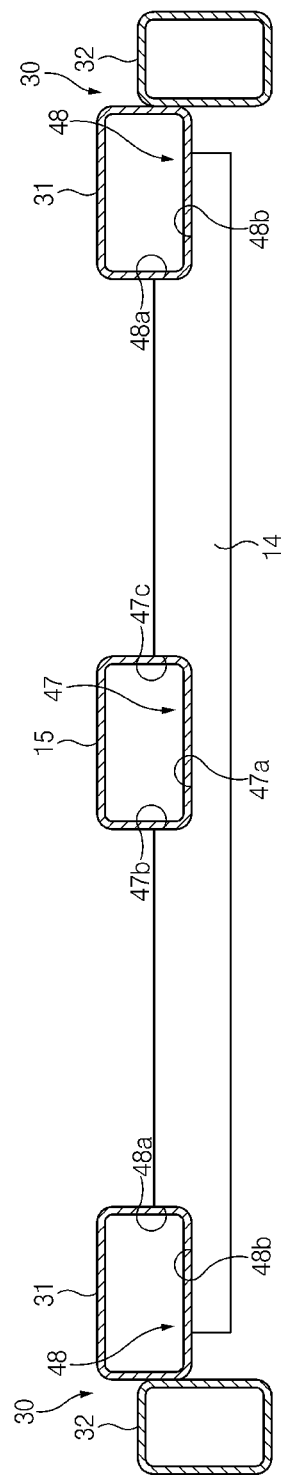
FIG. 7 illustrates a cross-sectional view, taken along line D-D of FIG. 4.

The pair of side sills 30 may be spaced apart from each other in the width direction of the vehicle, and each side sill 30 may extend in the longitudinal direction of the vehicle. Referring to FIG. 7, each side sill 30 may include a side sill inner 31 facing the interior of the vehicle, and a side sill outer 32 facing the exterior of the vehicle.

The side sill inner 31 may have an angular cross section or a circular cross section with a cavity defined therein, and accordingly the side sill inner 31 may have a closed cross section.

An inboard side surface of the side sill outer 32 may be fixed to an outboard side surface of the side sill inner 31 using fasteners, welding, and/or the like. The side sill outer 32 may be made of a mass-produced steel pipe having an angular cross section or a circular cross section with a cavity defined therein, and accordingly the side sill outer 32 may have a closed cross section. For example, the mass-produced steel pipe may be SGH400, SGH490, or the like.

Each of the side sill inner 31 and the side sill outer 32 may have a closed cross section, and the cavity of the side sill outer 32 may be separated from the cavity of the side sill inner 31. Since the cavity of the side sill inner 31 and the cavity of the side sill outer 32 are separated from each other, the side sill 30 may have a double closed cross section, thereby enhancing strength and stiffness thereof.

The side sill inner 31 may be made of a material having higher strength and stiffness than a material of the side sill outer 32. As the material of the side sill inner 31 has higher strength and stiffness than the material of the side sill outer 32, side stiffness of the center frame module 2 may be significantly improved.

According to an exemplary embodiment, the side sill inner 31 may be made of a high-tensile strength steel plate such as SPFC1180Y through hot stamping, hot forming, press hardening, and/or roll forming. Accordingly, side crash performance (crashworthiness) of the side sills 30 may be improved so that a battery and a passenger compartment may be safely protected in the event of a side collision.

The cross-sectional areas and thicknesses of the side sill inner 31 and the side sill outer 32 may be determined to have the same or similar moment of inertia compared to an existing side sill according to the related art.

According to an exemplary embodiment, as illustrated in FIG. 7, the cross-sectional area of the side sill inner 31 may be greater than the cross-sectional area of the side sill outer 32. In addition, the thickness of the side sill inner 31 may be greater than the thickness of the side sill outer 32.

The side sill inner 31 and the side sill outer 32 may be joined to form a stepped structure. Referring to FIG. 7, a bottom surface of the side sill outer 32 may be located lower than a bottom surface of the side sill inner 31. Accordingly, the side sill inner 31 and the side sill outer 32 may more safely protect a battery case located under the center frame module 2 in the event of a side collision of the vehicle.

Each side edge of an upper body may be directly mounted on the side sill outer 32 of the corresponding side sill 30. Referring to FIG. 7, a top surface of the side sill outer 32 may be located lower than a top surface of the side sill inner 31, and accordingly a mounting space of the upper body may be sufficiently secured.

The plurality of crossmembers 12, 14, 16, and 18 may include a dash crossmember 12 mounted on a dash panel, a front crossmember 14 located behind the dash crossmember 12, a first seat crossmember 16 located behind the front crossmember 14, and a second seat crossmember 18 located behind the first seat crossmember 16. The front crossmember 14, the first seat crossmember 16, and the second seat crossmember 18 may extend in the width direction of the vehicle. The front crossmember 14, the first seat crossmember 16, and the second seat crossmember 18 may be parallel to each other.

The dash crossmember 12 may block the dash panel from intruding into the passenger compartment in the event of a frontal collision of the vehicle. Referring to FIG. 1, the dash crossmember 12 may connect lower portions of the pair of front pillars 5a in the width direction of the vehicle. The dash crossmember 12 may be mounted under the dash panel, and the dash panel may serve as a partition between a front compartment and the passenger compartment. In addition, both end portions of the dash crossmember 12 may be joined to the pair of side sills 30 using fasteners, welding, and/or the like, respectively. According to an exemplary embodiment, the dash crossmember 12 may be made of a mass-produced steel pipe having an angular cross section or a circular cross section with a cavity defined therein, and accordingly the dash crossmember 12 may have a closed cross section. For example, the mass-produced steel pipe may be SGH400, SGH490, or the like.

The front crossmember 14 may be spaced apart from the dash crossmember 12 toward the rear of the vehicle, and be adjacent to a front end of the center frame module 2. Both end portions of the front crossmember 14 may be joined to the pair of side sills 30, respectively.

The front crossmember 14 may have an angular cross section or a circular cross section with a cavity defined therein, and accordingly the front crossmember 14 may have a closed cross section. According to an exemplary embodiment, the front crossmember 14 may be made of a high-tensile strength steel plate such as SPFC1180Y through hot stamping, hot forming, press hardening, and/or roll forming. Accordingly, the high-strength front crossmember 14 may improve crashworthiness and stiffness of the center frame module 2, thereby safely protecting the battery and the passenger compartment in the event of a collision of the vehicle.

The first seat crossmember 16 may be spaced apart from the front crossmember 14 toward the rear of the vehicle, and be located in the middle of the center frame module 2. A vehicle seat may be mounted on the first seat crossmember 16 through brackets, and thus the first seat crossmember 16 may support the vehicle seat.

The first seat crossmember 16 may have an angular cross section or a circular cross section with a cavity defined therein, and accordingly the first seat crossmember 16 may have a closed cross section. According to an exemplary embodiment, the first seat crossmember 16 may be made of a high-tensile strength steel plate such as SPFC1180Y through hot stamping, hot forming, press hardening, and/or roll forming. Accordingly, the high-strength first seat crossmember 16 may improve crashworthiness and stiffness of the center frame module 2, thereby safely protecting the battery and the passenger compartment in the event of a collision of the vehicle.

The second seat crossmember 18 may be spaced apart from the first seat crossmember 16 toward the rear of the vehicle, and be adjacent to a rear end of the center frame module 2. A vehicle seat may be mounted on the second seat crossmember 18 through brackets, and thus the second seat crossmember 18 may support the vehicle seat.

The second seat crossmember 18 may have an angular cross section or a circular cross section with a cavity defined therein, and accordingly the second seat crossmember 18 may have a closed cross section. According to an exemplary embodiment, the second seat crossmember 18 may be made of a high-tensile strength steel plate such as SPFC1180Y through hot stamping, hot forming, press hardening, and/or roll forming. Accordingly, the high-strength second seat crossmember 18 may improve crashworthiness and stiffness of the center frame module 2, thereby safely protecting the battery and the passenger compartment in the event of a collision of the vehicle.

The plurality of longitudinal members 13, 15, 17a, and 17b may include a pair of rear lower members 13 extending from the dash crossmember 12 to the front crossmember 14, a central longitudinal member 15 extending from the dash crossmember 12 to the first seat crossmember 16, a pair of first side longitudinal members 17a extending from the first seat crossmember 16 to the second seat crossmember 18, and a pair of second side longitudinal members 17b extending from the second seat crossmember 18 to the intermediate structure 20.

The pair of rear lower members 13 may be spaced apart from each other in the width direction of the vehicle, and each of the rear lower members 13 may extend in the longitudinal direction of the vehicle. According to an exemplary embodiment, the rear lower members 13 may be made of a high-tensile strength steel plate such as SPFC1470 through hot stamping, hot forming, press hardening, and/or roll forming, whereby front crash performance (crashworthiness) of the vehicle may be improved, and thus the battery and the passenger compartment may be safely protected in the event of a frontal collision.

The central longitudinal member 15 may extend along a central longitudinal axis of the vehicle.

The pair of first side longitudinal members 17a may be spaced apart from each other in the width direction of the vehicle, and each first side longitudinal member 17a may extend in the longitudinal direction of the vehicle. A front end of each first side longitudinal member 17a may be joined to the first seat crossmember 16 using fasteners, welding, and/or the like, and a rear end of the first side longitudinal member 17a may be joined to the second seat crossmember 18 using fasteners, welding, and/or the like.

The pair of second side longitudinal members 17b may be spaced apart from each other in the width direction of the vehicle, and each second side longitudinal member 17b may extend in the longitudinal direction of the vehicle. A front end of each second side longitudinal member 17b may be joined to the second seat crossmember 18 using fasteners, welding, and/or the like, and a rear end of the second side longitudinal member 17b may be joined to the intermediate structure 20 using fasteners, welding, and/or the like.

Each second side longitudinal member 17b may be aligned with the corresponding first side longitudinal member 17a in the longitudinal direction of the vehicle. In particular, the front end of each second side longitudinal member 17b and the rear end of the corresponding first side longitudinal member 17a may face each other with the second seat crossmember 18 disposed therebetween. A longitudinal axis of the second side longitudinal member 17b may be aligned with a longitudinal axis of the corresponding first side longitudinal member 17a.

According to an exemplary embodiment, the central longitudinal member 15, the first side longitudinal member 17a, and the second side longitudinal member 17b may be made of a mass-produced steel pipe having an angular cross section or a circular cross section with a cavity defined therein, and accordingly the central longitudinal member 15, the first side longitudinal member 17a, and the second side longitudinal member 17b may have a closed cross section. For example, the mass-produced steel pipe may be SGH400, SGH490, or the like.

Figure 2:
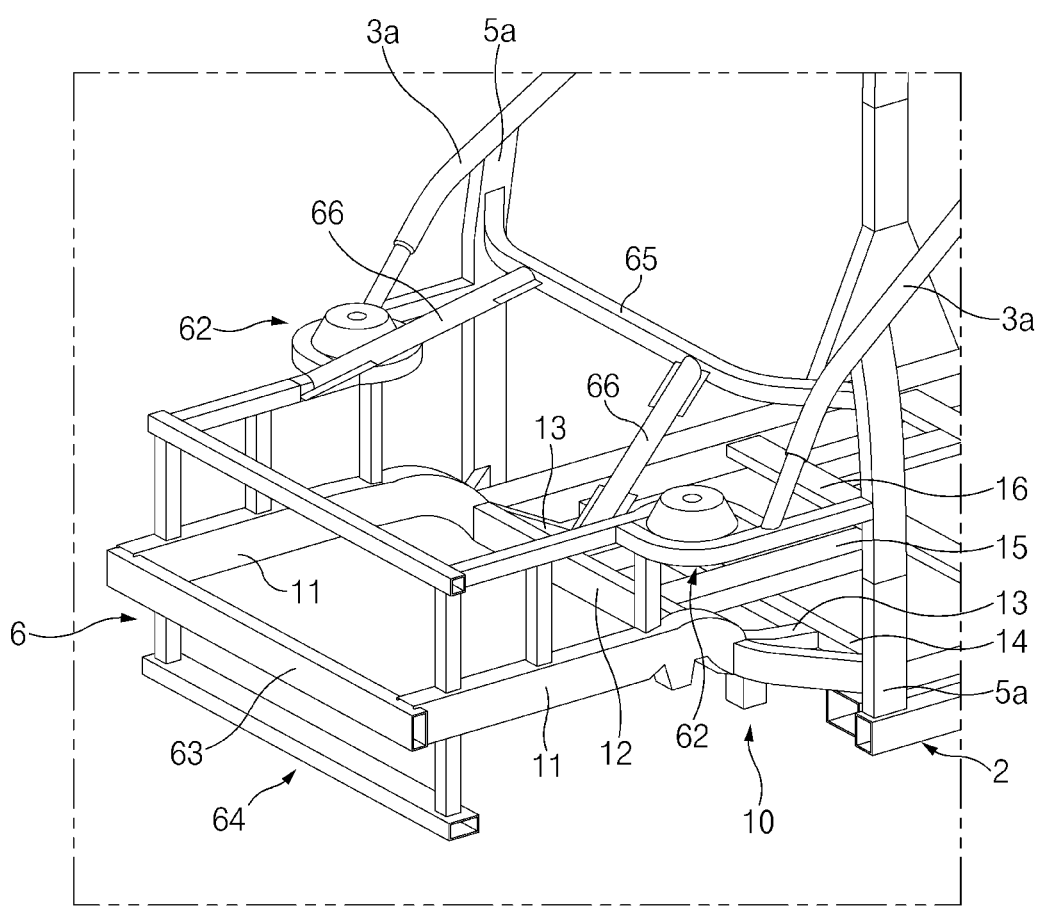
FIG. 2 illustrates a perspective view of a front portion of the vehicle frame illustrated in FIG. 1.

Referring to FIGS. 1 and 2, the front structure 6 may be connected to the center frame module 2, the pair of front pillars 5a, and the pair of front extension portions 3a. The front structure 6 may include a pair of front side members 11, a pair of fender upper members 62 located above the pair of front side members 11, respectively, a bumper back beam 63 connecting front ends of the pair of front side members 11, a front end module 64 connected to the pair of front side members 11 and the pair of fender upper members 62, and an upper crossmember 65 connecting the pair of front pillars 5a.

The pair of front side members 11 may be spaced apart from each other in the width direction of the vehicle on the front of the vehicle, and each front side member 11 may extend in the longitudinal direction of the vehicle. The front side member 11 may extend from the dash crossmember 12 of the center frame module 2 to the front of the vehicle. A rear end of the front side member 11 may be joined to the dash crossmember 12 of the center frame module 2 using fasteners, welding, and/or the like, and the front end of the front side member 11 may be joined to a corresponding end portion of the bumper back beam 63 using fasteners, welding, and/or the like. According to an exemplary embodiment, the front side member 11 may be made of a mass-produced steel pipe having an angular cross section or a circular cross section with a cavity defined therein, and accordingly the front side member 11 may have a closed cross section. For example, the mass-produced steel pipe may be SGH400, SGH490, or the like.

The pair of fender upper members 62 may be spaced apart from each other in the width direction of the vehicle, and each fender upper member 62 may extend in the longitudinal direction of the vehicle. Each fender upper member 62 may be upwardly spaced apart from the corresponding front side member 11. According to an exemplary embodiment, the fender upper member 62 may be made of a mass-produced steel pipe having an angular cross section or a circular cross section with a cavity defined therein, and accordingly the fender upper member 62 may have a closed cross section. For example, the mass-produced steel pipe may be SGH400, SGH490, or the like.

The bumper back beam 63 may extend in the width direction of the vehicle, and the bumper back beam 63 may connect the front ends of the pair of front side members 11. Each end portion of the bumper back beam 63 may be joined to the front end of the corresponding front side member 11. According to an exemplary embodiment, the bumper back beam 63 may be made of a high-tensile strength steel plate through hot stamping, hot forming, press hardening, and/or roll forming.

The front end module 64 may be a frame supporting a heat exchanger such as a radiator, a condenser, and an intercooler.

According to an exemplary embodiment, the front end module 64 may be made of a plurality of mass-produced steel pipes.

The upper crossmember 65 may extend in the width direction of the vehicle, and each end portion of the upper crossmember 65 may be joined to the corresponding front pillar 5a. Referring to FIGS. 1 and 2, a pair of strut bars 66 may extend from the upper crossmember 65 to the pair of fender upper members 62, respectively, and the pair of strut bars 66 may be spaced apart from each other in a longitudinal direction of the upper crossmember 65. A top end of each strut bar 66 may be joined to a portion of the upper crossmember 65 adjacent to the end portion of the upper crossmember 65, and a bottom end of the strut bar 66 may be joined to the corresponding fender upper member 62. That is, the pair of fender upper members 62 may be connected to the upper crossmember 65 through the pair of strut bars 66. According to an exemplary embodiment, the upper crossmember 65 and the strut bar 66 may be made of a mass-produced steel pipe having an angular cross section or a circular cross section with a cavity defined therein, and accordingly the upper crossmember 65 and the strut bar 66 may have a closed cross section. For example, the mass-produced steel pipe may be SGH400, SGH490, or the like.

Referring to FIG. 3, the rear frame module 9 may include a pair of rear side members 91, a rear crossmember 92 connecting the pair of rear side members 91, and a rear back beam 93 connecting rear ends of the rear side members 91.

The pair of rear side members 91 may be spaced apart from each other in the width direction of the vehicle on the rear of the vehicle, and each rear side member 91 may extend in the longitudinal direction of the vehicle. Each rear side member 91 may extend from a rear portion of the corresponding side sill 30 to the rear of the vehicle, and a front portion of the rear side member 91 may be joined to the inboard side surface of the rear portion of the corresponding side sill 30 using fasteners, welding, and/or the like. That is, the pair of rear side members 91 may be connected to the inboard side surfaces of the pair of side sills 30, respectively. The rear crossmember 92 and the rear back beam 93 may extend in the width direction of the vehicle.

According to an exemplary embodiment, the rear side member 91 may be made of a mass-produced steel pipe having an angular cross section or a circular cross section with a cavity defined therein, and accordingly the rear side member 91 may have a closed cross section. For example, the mass-produced steel pipe may be SGH400, SGH490, or the like.

Referring to FIG. 1, the rear frame module 9 may be located higher than the center frame module 2, and the intermediate structure 20 may connect the center frame module 2 and the rear frame module 9.

Referring to FIG. 3, the vehicle frame 1 according to an exemplary embodiment of the present disclosure may further include a rear subframe 80 mounted on the rear frame module 9. The rear subframe 80 may include a pair of front mounting portions 81 mounted on the front portions of the pair of rear side members 91, respectively, and a pair of rear mounting portions 82 mounted on the rear portions of the pair of rear side members 91, respectively.

According to an exemplary embodiment of the present disclosure, except for the strength members or stiffness members such as the bumper back beam 63, the front crossmember 14, the first seat crossmember 16, the second seat crossmember 18, the rear lower member 13, and the side sill inner 31, most of the members constituting the center frame module 2, the front structure 6, and the rear frame module 9 may be made of mass-produced steel pipes. In particular, the mass-produced steel pipe may have an angular cross section or a circular cross section with a cavity defined therein, and the shape and size thereof may be standardized. Each member made of the mass-produced steel pipe may have a closed cross section. Thus, the vehicle frame 1 according to an exemplary embodiment of the present disclosure may form a relatively inexpensive and stable space frame.

The vehicle frame 1 according to an exemplary embodiment of the present disclosure may include a vehicle load distribution system 10 uniformly distributing a load in the event of a frontal collision of the vehicle. The vehicle load distribution system 10 may be disposed between the front structure 6 and the center frame module 2. According to an exemplary embodiment of the present disclosure, the pair of front side members 11, the dash crossmember 12, the pair of rear lower members 13, and the central longitudinal member 15 may constitute the vehicle load distribution system 10.

As illustrated in FIG. 4, the rear end of each front side member 11 may be joined to the dash crossmember 12, and each rear lower member 13 may be joined to the dash crossmember 12 while being aligned with the rear portion of the corresponding front side member it A front end of each rear lower member 13 may be joined to the dash crossmember 12 using fasteners, welding, and/or the like, and a rear end of the rear lower member 13 may be joined to the front crossmember 14 using fasteners, welding, and/or the like. That is, the rear lower member 13 may connect the dash crossmember 12 and the front crossmember 14. The front end of the rear lower member 13 may face the rear end of the front side member 11 with the dash crossmember 12 disposed therebetween. That is, the front end of the rear lower member 13 may be aligned with the rear end of the corresponding front side member 11.

A longitudinal axis of the rear lower member 13 may be aligned with a longitudinal axis of the rear portion of the corresponding front side member 11. Referring to FIG. 4, the rear portion of each front side member 11 may extend diagonally toward the dash crossmember 12 while being inclined at a predetermined angle, and each rear lower member 13 may extend diagonally from the dash crossmember 12 toward the front crossmember 14 while being inclined at a predetermined angle. The rear lower member 13 may be inclined at the same angle as that of the rear portion of the front side member 11 so that the front end of the rear lower member 13 may be aligned with the rear end of the front side member 11. As the rear lower member 13 is aligned with the corresponding front side member 11, a load may be stably transferred and distributed to the front side member 11, the dash crossmember 12, and the rear lower member 13.

Figure 5:
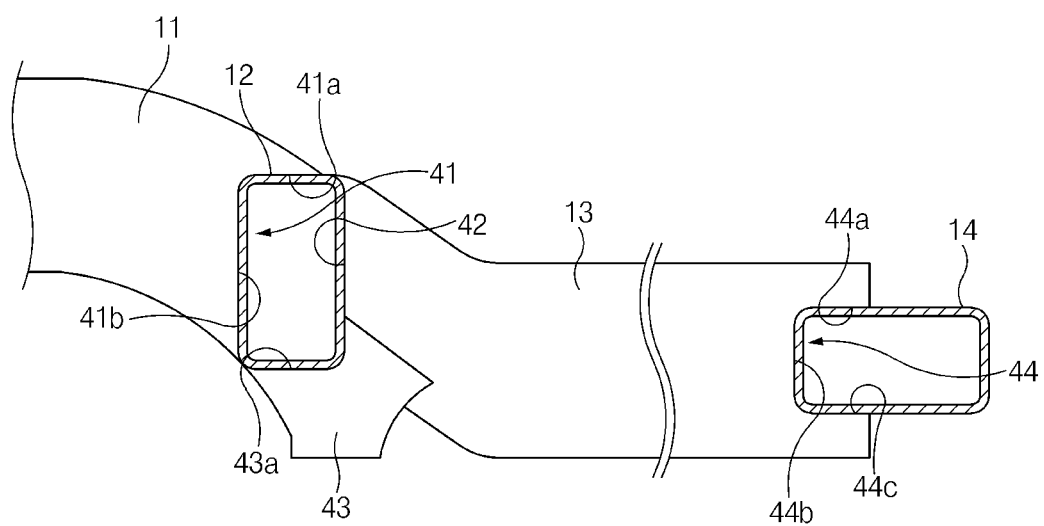
FIG. 5 illustrates a cross-sectional view, taken along line B-B of FIG. 4.

Referring to FIG. 5, each front side member 11 may have an opening 41 provided in the rear end thereof, and the dash crossmember 12 may be fitted into the opening 41 of the front side member 11.

According to an exemplary embodiment, the opening 41 may include a top engaging portion 41a joined to a top surface of the dash crossmember 12, and a front engaging portion 41b joined to a front surface of the dash crossmember 12. The top engaging portion 41a may be horizontally flat to match the top surface of the dash crossmember 12, and the top engaging portion 41a may be joined to the top surface of the dash crossmember 12 by welding ($CO_2$ welding or the like), using fasteners, and/or the like. The front engaging portion 41b may be vertically flat to match the front surface of the dash crossmember 12, and the front engaging portion 41b may be joined to the front surface of the dash crossmember 12 by welding ($CO_2$ welding or the like), using fasteners, and/or the like. Accordingly, the opening 41 of the front side member 11 may have an L-shaped cross section, and thus the rear end of the front side member 11 may be mechanically joined to the dash crossmember 12. That is, the rear end of the front side member 11 may be very firmly joined to the dash crossmember 12 through a mechanical joint system. According to another exemplary embodiment of the present disclosure, the opening 41 of the front side member 11 may have a U-shaped cross section, and thus the rear end of the front side member 11 may be more firmly joined to the dash crossmember 12.

Referring to FIG. 5, each rear lower member 13 may have a front engaging portion 42 provided on the front end thereof. The front engaging portion 42 may be vertically flat to match a rear surface of the dash crossmember 12, and the front engaging portion 42 may be joined to the rear surface of the dash crossmember 12 by welding ($CO_2$ welding or the like), using fasteners, and/or the like. A bracket 43 may be integrally connected to the front end of the rear lower member 13 using fasteners, welding, and/or the like, and the bracket 43 may have a bottom engaging portion 43a that is horizontally flat to match a bottom surface of the dash crossmember 12. Accordingly, the front engaging portion 42 of the rear lower member 13 and the bottom engaging portion 43a of the bracket 43 may form an L-shaped cross section, and thus the front end of the rear lower member 13 may be mechanically joined to the dash crossmember 12. That is, the front end of the rear lower member 13 may be very firmly joined to the dash crossmember 12 through a mechanical joint system. Accordingly, the front engaging portion 41b of the opening 41 of the front side member 11 and the front engaging portion 42 of the rear lower member 13 may face each other with the dash crossmember 12 disposed therebetween. The top engaging portion 41a of the opening 41 of the front side member 11 and the bottom engaging portion 43a of the bracket 43 may face each other with the dash crossmember 12 disposed therebetween.

As described above, the rear end of the front side member 11 and the front end of the rear lower member 13 may be joined and supported to the dash crossmember 12 through the mechanical joint system, and thus a load transferred to the front side member 11 may be uniformly distributed and transferred to the dash crossmember 12 and the rear lower member 13.

Referring to FIG. 5, each rear lower member 13 may have an opening 44 provided in the rear end thereof, and the front crossmember 14 may be fitted into the opening 44 of the rear lower member 13.

According to an exemplary embodiment, the opening 44 may include a top engaging portion 44a joined to a top surface of the front crossmember 14, a front engaging portion 44b joined to a front surface of the front crossmember 14, and a bottom engaging portion 44c joined to a bottom surface of the front crossmember 14. The top engaging portion 44a may be horizontally flat to match the top surface of the front crossmember 14, and the top engaging portion 44a may be joined to the top surface of the front crossmember 14 by welding ($CO_2$ welding or the like), using fasteners, and/or the like. The front engaging portion 44b may be vertically flat to match the front surface of the front crossmember 14, and the front engaging portion 44b may be joined to the front surface of the front crossmember 14 by welding ($CO_2$ welding or the like), using fasteners, and/or the like. The bottom engaging portion 44c may be horizontally flat to match the bottom surface of the front crossmember 14, and the bottom engaging portion 44c may be joined to the bottom surface of the front crossmember 14 by welding ($CO_2$ welding or the like), using fasteners, and/or the like. The opening 44 of the rear lower member 13 may have a U-shaped cross section, and thus the rear end of the rear lower member 13 may be mechanically joined to the front crossmember 14. That is, the rear end of the rear lower member 13 may be very firmly joined to the front crossmember 14 through a mechanical joint system.

In the vehicle load distribution system according to an exemplary embodiment of the present disclosure, as illustrated in FIG. 4, a front end of the central longitudinal member 15 may be joined to a central portion of the dash crossmember 12 using fasteners, welding, and/or the like, and a rear end of the central longitudinal member 15 may be joined to a central portion of the first seat crossmember 16 using fasteners, welding, and/or the like. The pair of rear lower members 13 may be symmetrical to each other with respect to the central longitudinal member 15.

Figure 6:
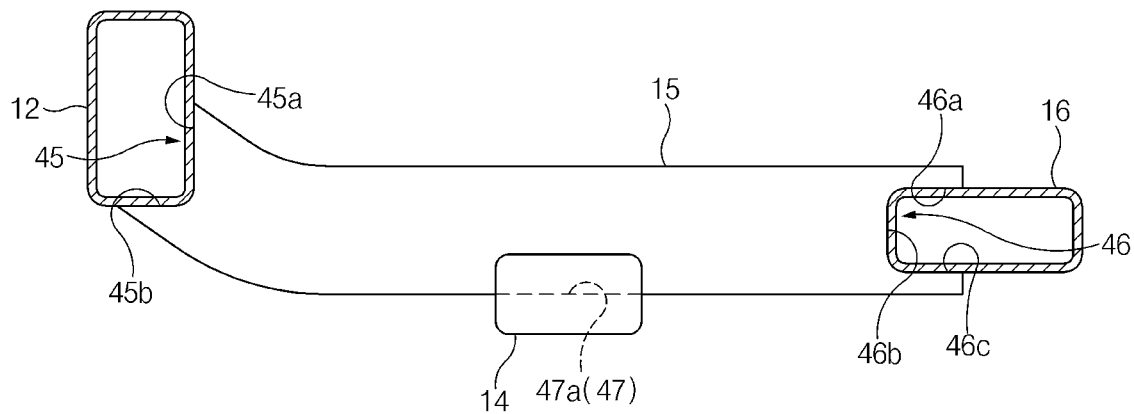
FIG. 6 illustrates a cross-sectional view, taken along line C-C of FIG. 4.

Referring to FIG. 6, the central longitudinal member 15 may have a front opening 45 provided in the front end thereof, and a rear opening 46 provided in the rear end thereof.

The dash crossmember 12 may be fitted into the front opening 45 of the central longitudinal member 15. According to an exemplary embodiment, the front opening 45 may include a front engaging portion 45a joined to the rear surface of the dash crossmember 12, and a bottom engaging portion 45b joined to the bottom surface of the dash crossmember 12. The front engaging portion 45a may be vertically flat to match the rear surface of the dash crossmember 12, and the front engaging portion 45a may be joined to the rear surface of the dash crossmember 12 by welding ($CO_2$ welding or the like), using fasteners, and/or the like. The bottom engaging portion 45b may be horizontally flat to match the bottom surface of the dash crossmember 12, and the bottom engaging portion 45b may be joined to the bottom surface of the dash crossmember 12 by welding ($CO_2$ welding or the like), using fasteners, and/or the like. Accordingly, the front opening 45 of the central longitudinal member 15 may have an L-shaped cross section, and thus the front end of the central longitudinal member 15 may be mechanically joined to the dash crossmember 12. That is, the front end of the central longitudinal member 15 may be very firmly joined to the dash crossmember 12 through a mechanical joint system.

The first seat crossmember 16 may be fitted into the rear opening 46 of the central longitudinal member 15. According to an exemplary embodiment, the rear opening 46 may include a top engaging portion 46a joined to a top surface of the first seat crossmember 16, a rear engaging portion 46b joined to a front surface of the first seat crossmember 16, and a bottom engaging portion 46c joined to a bottom surface of the first seat crossmember 16. The top engaging portion 46a may be horizontally flat to match the top surface of the first seat crossmember 16, and the top engaging portion 46a may be joined to the top surface of the first seat crossmember 16 by welding ($CO_2$ welding or the like), using fasteners, and/or the like. The rear engaging portion 46b may be vertically flat to match the front surface of the first seat crossmember 16, and the rear engaging portion 46b may be joined to the front surface of the first seat crossmember 16 by welding ($CO_2$ welding or the like), using fasteners, and/or the like. The bottom engaging portion 46c may be horizontally flat to match the bottom surface of the first seat crossmember 16, and the bottom engaging portion 46c may be joined to the bottom surface of the first seat crossmember 16 by welding ($CO_2$ welding or the like), using fasteners, and/or the like. Accordingly, the rear opening 46 of the central longitudinal member 15 may have a U-shaped cross section, and thus the rear end of the central longitudinal member 15 may be mechanically joined to the first seat crossmember 16. That is, the rear end of the central longitudinal member 15 may be very firmly joined to the first seat crossmember 16 through a mechanical joint system.

In the vehicle load distribution system according to an exemplary embodiment of the present disclosure, as illustrated in FIG. 4, both end portions of the front crossmember 14 may be joined to the pair of side sills 30 using fasteners, welding, and/or the like, respectively.

Referring to FIG. 7, the front crossmember 14 may have a pair of side openings 48 provided in both end portions thereof, respectively. The side sill inner 31 of each side sill 30 may be fitted into the corresponding side opening 48 of the front crossmember 14. According to an exemplary embodiment, each side opening 48 may include a side engaging portion 48a joined to the inboard side surface of the side sill inner 31 of the side sill 30, and a bottom engaging portion 48b joined to the bottom surface of the side sill inner 31 of the side sill 30. The side engaging portion 48a may be vertically flat to match the inboard side surface of the side sill inner 31 of the side sill 30, and the side engaging portion 48a may be joined to the inboard side surface of the side sill inner 31 of the side sill 30 by welding ($CO_2$ welding or the like), using fasteners, and/or the like. The bottom engaging portion 48b may be horizontally flat to match the bottom surface of the side sill inner 31 of the side sill 30, and the bottom engaging portion 48b may be joined to the bottom surface of the side sill inner 31 of the side sill 30 by welding ($CO_2$ welding or the like), using fasteners, and/or the like. Accordingly, the side opening 48 of the front crossmember 14 may have an L-shaped cross section, and thus each end portion of the front crossmember 14 may be mechanically joined to the side sill 30. That is, both end portions of the front crossmember 14 may be very firmly joined to the pair of side sills 30 through a mechanical joint system.

Referring to FIG. 7, the front crossmember 14 may include a central opening 47 provided in a central portion thereof. The central longitudinal member 15 may be fitted into the central opening 47 of the front crossmember 14. According to an exemplary embodiment, the central opening 47 may include a bottom engaging portion 47a joined to a bottom surface of the central longitudinal member 15, a first side engaging portion 47b joined to a first side surface of the central longitudinal member 15, and a second side engaging portion 47c joined to a second side surface of the central longitudinal member 15. The bottom engaging portion 47a may be horizontally flat to match the bottom surface of the central longitudinal member 15, and the bottom engaging portion 47a may be joined to the bottom surface of the central longitudinal member 15 by welding ($CO_2$ welding or the like), using fasteners, and/or the like. The first side engaging portion 47b may be vertically flat to match the first side surface of the central longitudinal member 15, and the first side engaging portion 47b, may be joined to the first side surface of the central longitudinal member 15 by welding ($CO_2$ welding or the like), using fasteners, and/or the like. The second side engaging portion 47c may be vertically flat to match the second side surface of the central longitudinal member 15, and the second side engaging portion 47c may be joined to the second side surface of the central longitudinal member 15 by welding ($CO_2$ welding or the like), using fasteners, and/or the like. Accordingly, the central opening 47 of the front crossmember 14 may have a U-shaped cross section, and thus the central longitudinal member 15 may be mechanically joined to the central portion of the front crossmember 14. That is, the central longitudinal member 15 may be very firmly joined to the central portion of the front crossmember 14 through a mechanical joint system.

During a frontal collision of the vehicle, the pair of front side members 11 may define a load path through which an impact load is primarily transferred, and the pair of rear lower members 13 may define a load path through which the impact load is secondarily transferred.

The pair of front side members 11 may be symmetrically connected to the dash crossmember 12 so that the dash crossmember 12 may primarily support the load transferred through the front side members 11. That is, the impact load may be transferred to the dash crossmember 12 through the pair of front side members 11, and the dash crossmember 12 may primarily support the transferred impact load so that the dash crossmember 12 may serve as a primary impact load support.

The pair of rear lower members 13 may connect the dash crossmember 12 and the front crossmember 14 so that the front crossmember 14 may secondarily support the load transferred through the rear lower members 13. The impact load may be transferred to the front crossmember 14 through the pair of rear lower members 13, and the front crossmember 14 may secondarily support the transferred impact load so that the front crossmember 14 may serve as a secondary impact load support. In particular, the rear lower members 13 may be made of a high-strength material, thus safely protecting the passenger compartment.

The central longitudinal member 15 may connect the dash crossmember 12 and the first seat crossmember 16 so that the first seat crossmember 16 may thirdly support the load transferred through the central longitudinal member 15. The impact load may be transferred to the first seat crossmember 16 through the central longitudinal member 15, and the first seat crossmember 16 may thirdly support the transferred impact load so that the first seat crossmember 16 may serve as a third impact load support. In particular, the first seat crossmember 16 may be made of a high-strength material, thus safely protecting the passenger compartment.

As set forth above, the vehicle load distribution system according to exemplary embodiments of the present disclosure may use a relatively inexpensive material such as mass-produced steel pipes, thereby significantly reducing the manufacturing cost thereof, compared to when using pressed steel materials and aluminum materials, and may uniformly distribute a load in the event of a frontal collision of the vehicle.

According to exemplary embodiments of the present disclosure, the pair of front side members may define a load path through which an impact load is primarily transferred during a frontal collision of the vehicle. The pair of front side members may be symmetrically connected to the dash crossmember so that the dash crossmember may primarily support the load transferred through the front side members. That is, the impact load may be transferred to the dash crossmember through the pair of front side members, and the dash crossmember may primarily support the transferred impact load. Accordingly, the dash crossmember may block the dash panel from intruding into the passenger compartment in the event of the frontal collision of the vehicle.

According to exemplary embodiments of the present disclosure, the pair of rear lower members may connect the dash crossmember and the front crossmember so that the front crossmember may secondarily support the load transferred through the rear lower members. The impact load may be transferred to the front crossmember through the pair of rear lower members, and the front crossmember may secondarily support the transferred impact load. According to exemplary embodiments of the present disclosure, the central longitudinal member may connect the dash crossmember and the seat crossmember so that the seat crossmember may thirdly support the load transferred through the central longitudinal member. The impact load may be transferred to the seat crossmember through the central longitudinal member, and the seat crossmember may thirdly support the transferred impact load.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A load distribution system for a vehicle, the load distribution system comprising:
   a dash crossmember;
   a pair of front side members extending from the dash crossmember toward a front of the vehicle; and
   a pair of rear lower members extending from the dash crossmember toward a rear of the vehicle, wherein a front end of each rear lower member is aligned with a rear end of a corresponding front side member,
   wherein each front side member has an opening provided in the rear end thereof, and
   wherein the dash crossmember is fitted and joined to the opening of the corresponding front side member.

2. The load distribution system according to claim 1, wherein the opening of the front side member comprises a top engaging portion joined to a top surface of the dash crossmember, and a front engaging portion joined to a front surface of the dash crossmember.

3. The load distribution system according to claim 1, wherein:
   each rear lower member comprises a front engaging portion provided on the front end thereof; and
   the front engaging portion is joined to a rear surface of the dash crossmember.

4. The load distribution system according to claim 3, wherein:
   the rear lower member further comprises a bracket integrally connected to the front end thereof; and
   the bracket comprises a bottom engaging portion joined to a bottom surface of the dash crossmember.

5. A vehicle load distribution system comprising:
   a dash crossmember;
   a pair of front side members extending from the dash crossmember toward a front of a vehicle;
   a pair of rear lower members extending from the dash crossmember toward a rear of the vehicle, wherein a front end of each rear lower member is aligned with a rear end of a corresponding front side member; and
   a front crossmember located behind the dash crossmember in a longitudinal direction of the vehicle, wherein the pair of rear lower members connects the dash crossmember and the front crossmember in the longitudinal direction of the vehicle,
   wherein each rear lower member has an opening provided in a rear end thereof, and
   wherein the front crossmember is fitted and joined to the opening of a corresponding rear lower member.

6. The vehicle load distribution system according to claim 5, wherein each opening of each rear lower member comprises a top engaging portion joined to a top surface of the front crossmember, a front engaging portion joined to a front surface of the front crossmember, and a bottom engaging portion joined to a bottom surface of the front crossmember.

7. The vehicle load distribution system according to claim 5, further comprising:
   a seat crossmember located behind the front crossmember in the longitudinal direction of the vehicle; and
   a central longitudinal member connecting the dash crossmember and the seat crossmember, wherein the central longitudinal member extends along a central longitudinal axis of the vehicle.

8. The vehicle load distribution system according to claim 7, wherein:
   the central longitudinal member has a front opening provided in a front end thereof; and
   the dash crossmember is fitted and joined to the front opening of the central longitudinal member.

9. The vehicle load distribution system according to claim 8, wherein the front opening comprises a front engaging portion joined to a rear surface of the dash crossmember, and a bottom engaging portion joined to a bottom surface of the dash crossmember.

10. The vehicle load distribution system according to claim 7, wherein:
    the central longitudinal member has a rear opening provided in a rear end thereof; and
    the seat crossmember is fitted and joined to the rear opening of the central longitudinal member.

11. The vehicle load distribution system according to claim 10, wherein the rear opening comprises a top engaging portion joined to a top surface of the seat crossmember, a rear engaging portion joined to a front surface of the seat crossmember, and a bottom engaging portion joined to a bottom surface of the seat crossmember.

12. The vehicle load distribution system according to claim 7, wherein:
    the front crossmember has a central opening provided in a central portion thereof; and
    the central longitudinal member is fitted and joined to the central opening of the front crossmember.

13. The vehicle load distribution system according to claim 12, wherein the central opening comprises a bottom engaging portion joined to a bottom surface of the central longitudinal member, a first side engaging portion joined to a first side surface of the central longitudinal member, and a second side engaging portion joined to a second side surface of the central longitudinal member.

14. The vehicle load distribution system according to claim 7, wherein the front crossmember, the rear lower member, and the seat crossmember each comprise a high-tensile strength steel plate.

15. The vehicle load distribution system according to claim 7, wherein the front side member, the dash crossmember, and the central longitudinal member each comprise a mass-produced steel pipe.

16. The vehicle load distribution system according to claim 5, wherein:
    the front crossmember has a pair of side openings provided in both end portions thereof, respectively; and
    each side sill is fitted and joined to a corresponding side opening of the front crossmember.

17. The vehicle load distribution system according to claim 16, wherein each side opening comprises a side engaging portion joined to an inboard side surface of the side sill and a bottom engaging portion joined to a bottom surface of the side sill.

18. A load distribution system for a vehicle, the load distribution system comprising:
- a dash crossmember;
- a pair of front side members extending from the dash crossmember toward a front of the vehicle; and
- a pair of rear lower members extending from the dash crossmember toward a rear of the vehicle, wherein a front end of each rear lower member is aligned with a rear end of a corresponding front side member,
- wherein each rear lower member comprises a front engaging portion provided on the front end thereof, and
- wherein the front engaging portion is joined to a rear surface of the dash crossmember.

19. The load distribution system according to claim 18, wherein the rear lower member further comprises a bracket integrally connected to the front end thereof, and wherein the bracket comprises a bottom engaging portion joined to a bottom surface of the dash crossmember.

20. The load distribution system according to claim 18, further comprising:
- a front crossmember located behind the dash crossmember in a longitudinal direction of the vehicle;
- a seat crossmember located behind the front crossmember in the longitudinal direction of the vehicle; and
- a central longitudinal member connecting the dash crossmember and the seat crossmember,
- wherein the central longitudinal member extends along a central longitudinal axis of the vehicle, and
- wherein the central longitudinal member has a front opening provided in a front end thereof, the dash crossmember being fitted and joined to the front opening of the central longitudinal member, or
- wherein the central longitudinal member has a rear opening provided in a rear end thereof, the seat crossmember being fitted and joined to the rear opening of the central longitudinal member.

\* \* \* \* \*